United States Patent
Kadota

(10) Patent No.: US 7,924,466 B2
(45) Date of Patent: Apr. 12, 2011

(54) IMAGE PROCESSING DEVICE, AND MEDIUM EMPLOYED FOR THE SAME

(75) Inventor: Masatoshi Kadota, Aichi (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 886 days.

(21) Appl. No.: 11/765,729

(22) Filed: Jun. 20, 2007

(65) Prior Publication Data

US 2007/0291314 A1 Dec. 20, 2007

(30) Foreign Application Priority Data

Jun. 20, 2006 (JP) .................................. 2006-170681

(51) Int. Cl.
*G03F 3/08* (2006.01)
(52) U.S. Cl. ............................ 358/3.1; 358/1.9; 358/518
(58) Field of Classification Search .................. 358/1.1, 358/1.9, 501, 518, 520, 521, 3.1; 382/162, 382/167

See application file for complete search history.

(56) References Cited

U.S. PATENT DOCUMENTS

| | | | | |
|---|---|---|---|---|
| 5,400,053 | A * | 3/1995 | Johary et al. .................. | 345/691 |
| 6,473,521 | B1 * | 10/2002 | Hino ............................. | 382/164 |
| 7,013,043 | B2 | 3/2006 | Kashioka | |
| 7,375,852 | B1 * | 5/2008 | Samoylenko ................. | 358/1.9 |
| 7,706,033 | B2 | 4/2010 | Kadota | |
| 2004/0080789 | A1 * | 4/2004 | Anderson ..................... | 358/2.1 |

FOREIGN PATENT DOCUMENTS

| | | |
|---|---|---|
| JP | 59128873 | 7/1984 |
| JP | 9-009007 A | 1/1997 |
| JP | 10111624 | 4/1998 |
| JP | 11-088712 A | 3/1999 |
| JP | 2001-268378 A | 9/2001 |
| JP | 2002-010090 A | 1/2002 |
| JP | 2005079750 | 3/2005 |
| JP | 2005-135321 A | 5/2005 |

OTHER PUBLICATIONS

Co-pending U.S. Appl. No. 11/765,672, filed Jun. 20, 2007.
JP Office Action dtd Apr. 15, 2008, JP Appln. 2006-170681.
JP Office Action dtd Apr. 15, 2008, JP Appln. 2006-170682.
Office Action dtd Aug. 20, 2009, U.S. Appl. No. 11/765,672.

* cited by examiner

*Primary Examiner* — Thomas D Lee
(74) *Attorney, Agent, or Firm* — Banner & Witcoff, Ltd.

(57) ABSTRACT

An image processing device is capable of generating single-hue image data from color image data, which include at least two records of a first area to be filled with a first color based on first hue component data and a second area to be filled with a second color based on second hue component data, the first and second areas establishing one of line contact and overlap therebetween. The image processing device includes a density determining unit that determines a first density of the first area and a second density of the second area in the single-hue image data based on the first hue component data and second hue component data, respectively, a comparing unit that compares the first and second densities as determined, and a modifying unit that modifies at least one of the first and second densities based on the comparison result by the comparing unit.

6 Claims, 7 Drawing Sheets

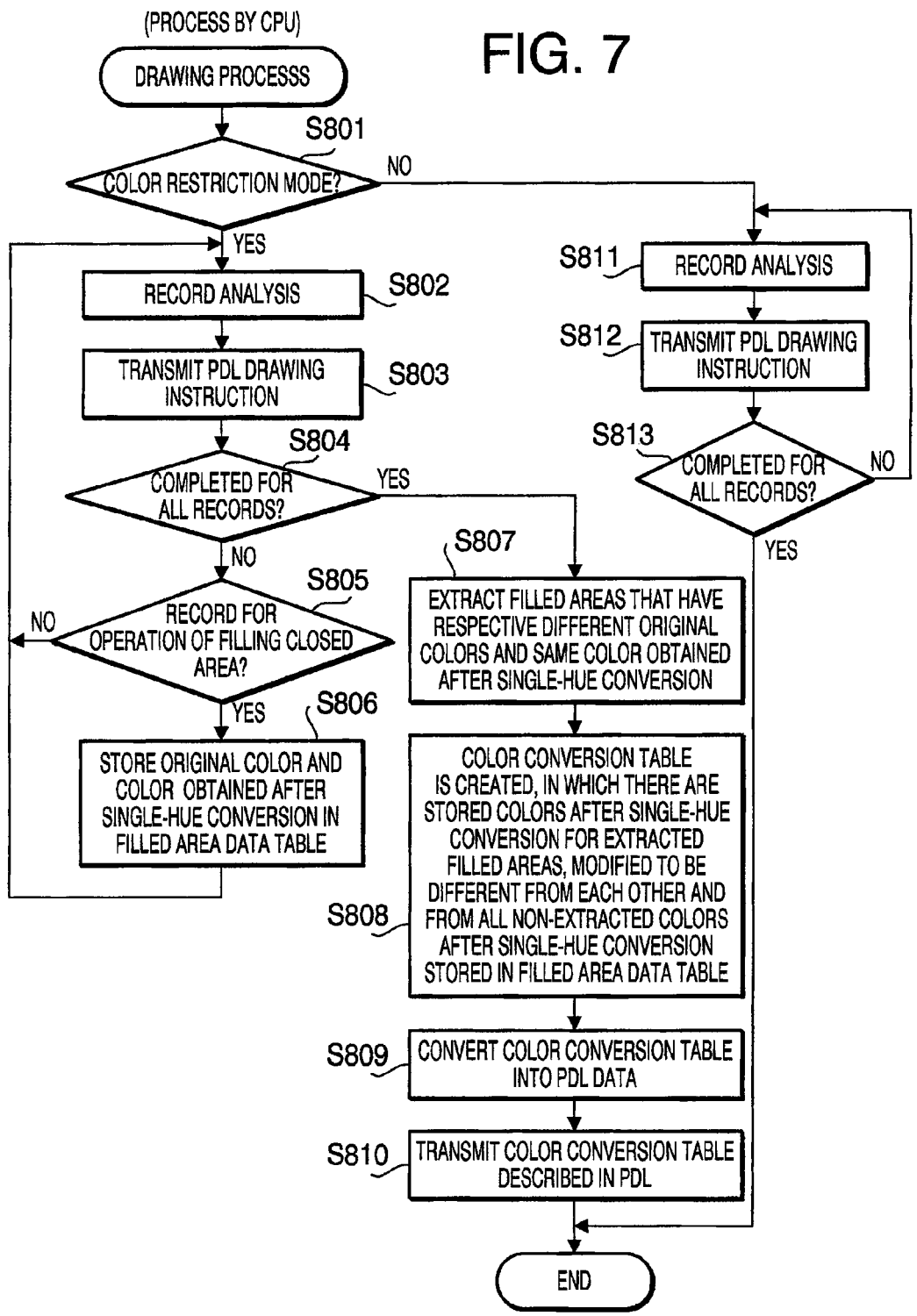

IMAGE PROCESSING DEVICE, AND MEDIUM EMPLOYED FOR THE SAME

CROSS-REFERENCE TO RELATED APPLICATION

This application claims priority under 35 U.S.C. §119 from Japanese Patent Application No. 2006-170681, filed on Jun. 20, 2006. The entire subject matter of the application is incorporated herein by reference.

BACKGROUND

1. Technical Field

The following description relates to one or more image processing techniques to clearly differentiate two areas in a single-hue image including a plurality of areas expressed by the same hue or achromatic color.

2. Related Art

There is disclosed in Japanese Patent Provisional Publication No. 2005-79750 (see paragraph 0014 or FIG. 1) a technique to extract a character highlighted in a color image before converting the color image into a monochrome image and express the extracted character as a character of the maximum density or an outline character, so as to solve a problem that it is hard to discriminate, from a background, the extracted character that has a density almost the same as the background in the monochrome image.

However, the above technique, disclosed in Japanese Patent Provisional Publication No. 2005-79750, can be applied to a character that is previously highlighted in the color image. Therefore, for example, when adjacent areas in a circle graph have their respective different hues and yet the same brightness (density) in the original color image, even though using the above technique, it is impossible to differentiate the adjacent areas in the monochrome image.

SUMMARY

Aspects of the present invention are advantageous in that there can be provided one or more improved techniques that make it possible to generate a single-hue image such that adjacent areas included therein, which have their respective different hues in an original color image, can clearly be discriminated.

BRIEF DESCRIPTION OF THE ACCOMPANYING DRAWINGS

Figure 3C:
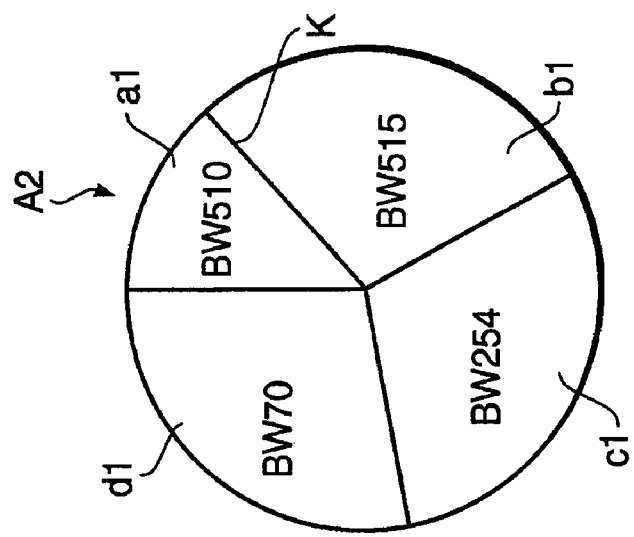
Figure 3B:
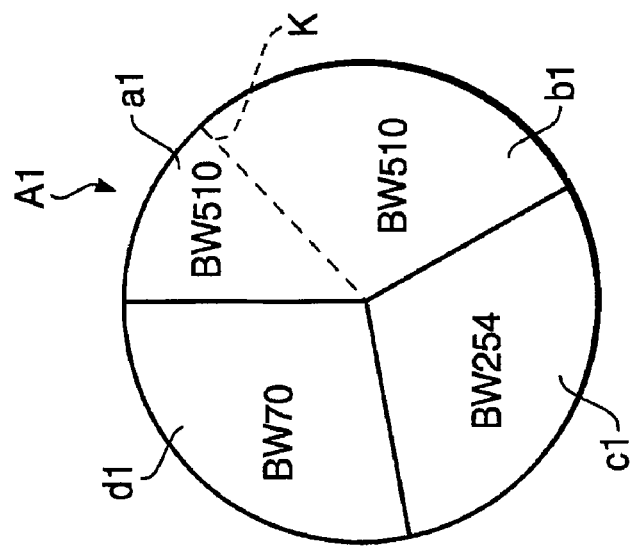
Figure 3A:
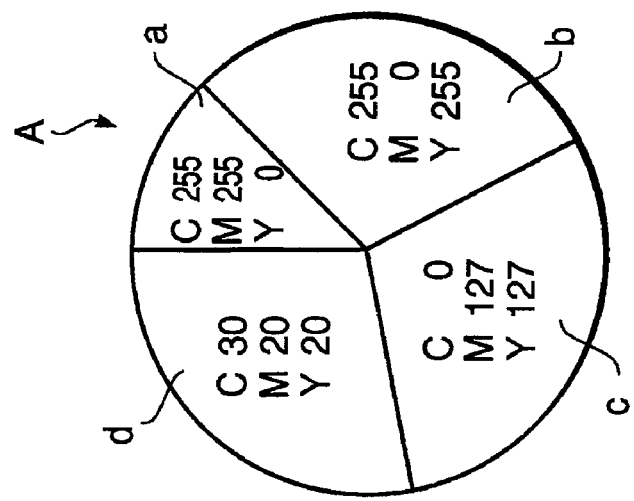

FIGS. 3A, 3B, and 3C are illustrations for explaining a concept of the present invention, and respectively show a circle graph in an original color image, a circle graph corresponding to the circle graph shown in FIG. 3A in a single-hue image into which the original color image is converted in a conventional method, and a circle graph corresponding to the circle graph shown in FIG. 3A in a single-hue image into which the original color image is converted in a method according to one or more aspects of the present invention.

Figure 4:
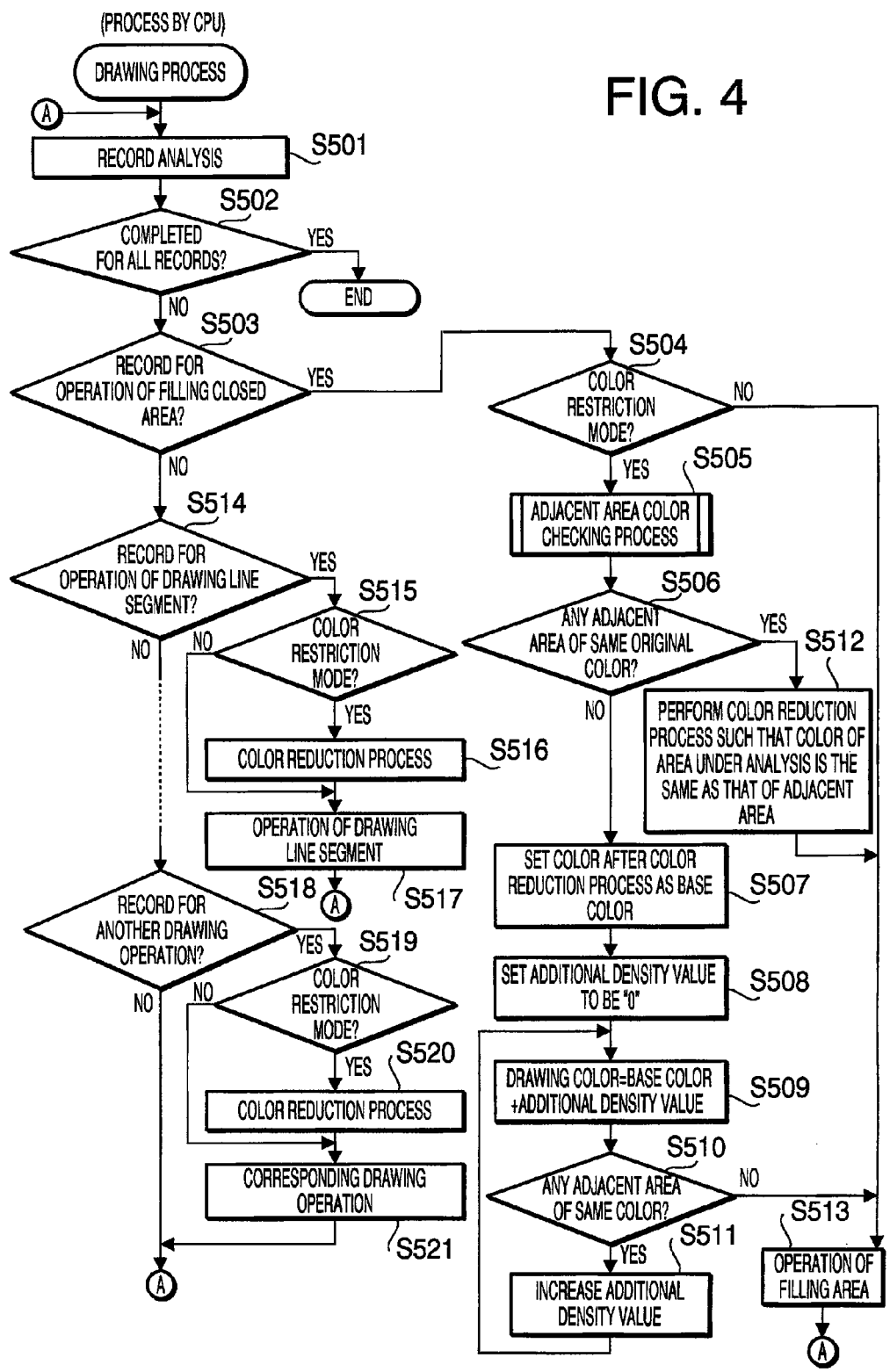

FIG. 4 is a flowchart showing a drawing process in a first embodiment according to one or more aspects of the present invention.

Figure 5:
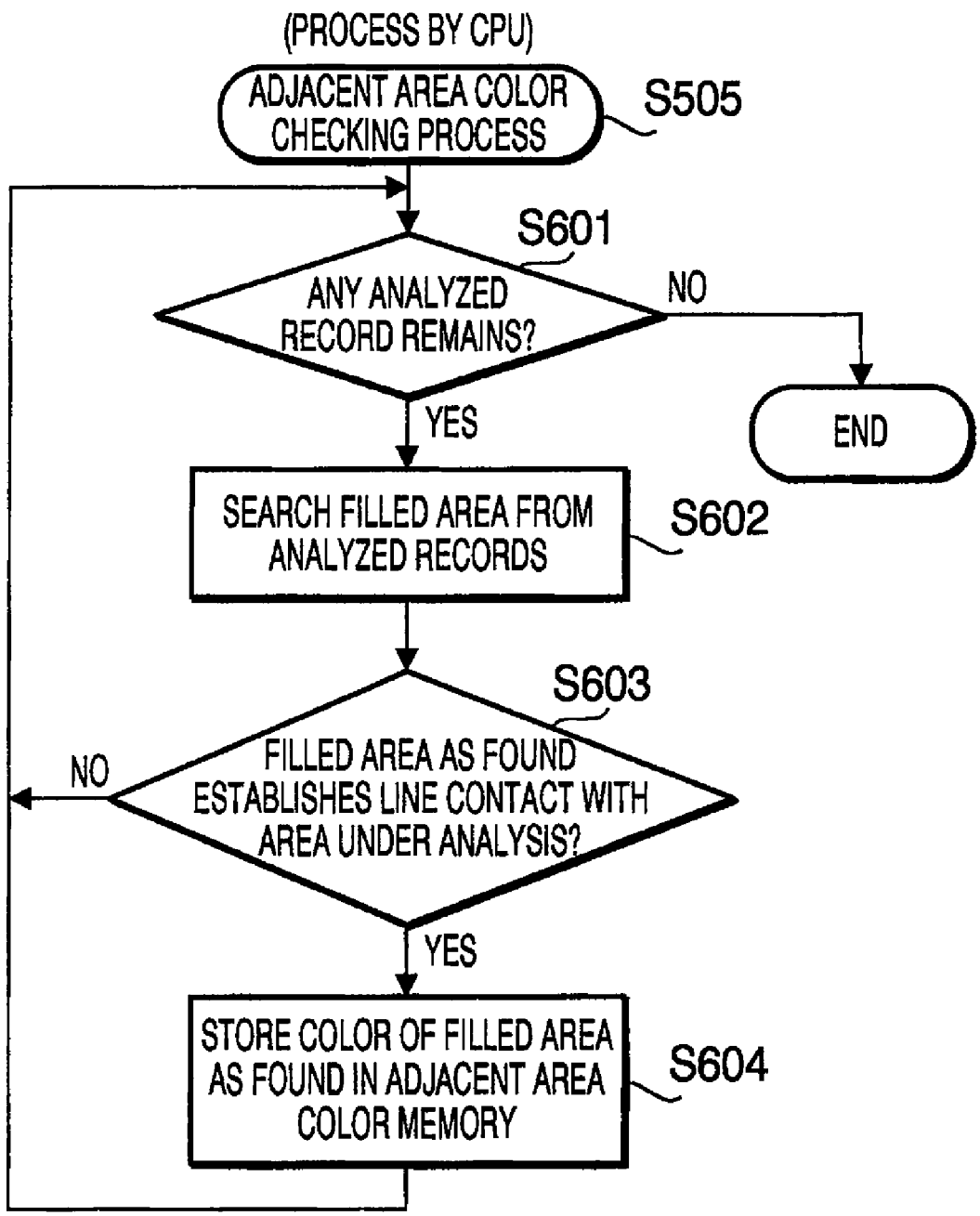

FIG. 5 is a flowchart showing an adjacent area color checking process in the first embodiment according to one or more aspects of the present invention.

Figure 6:
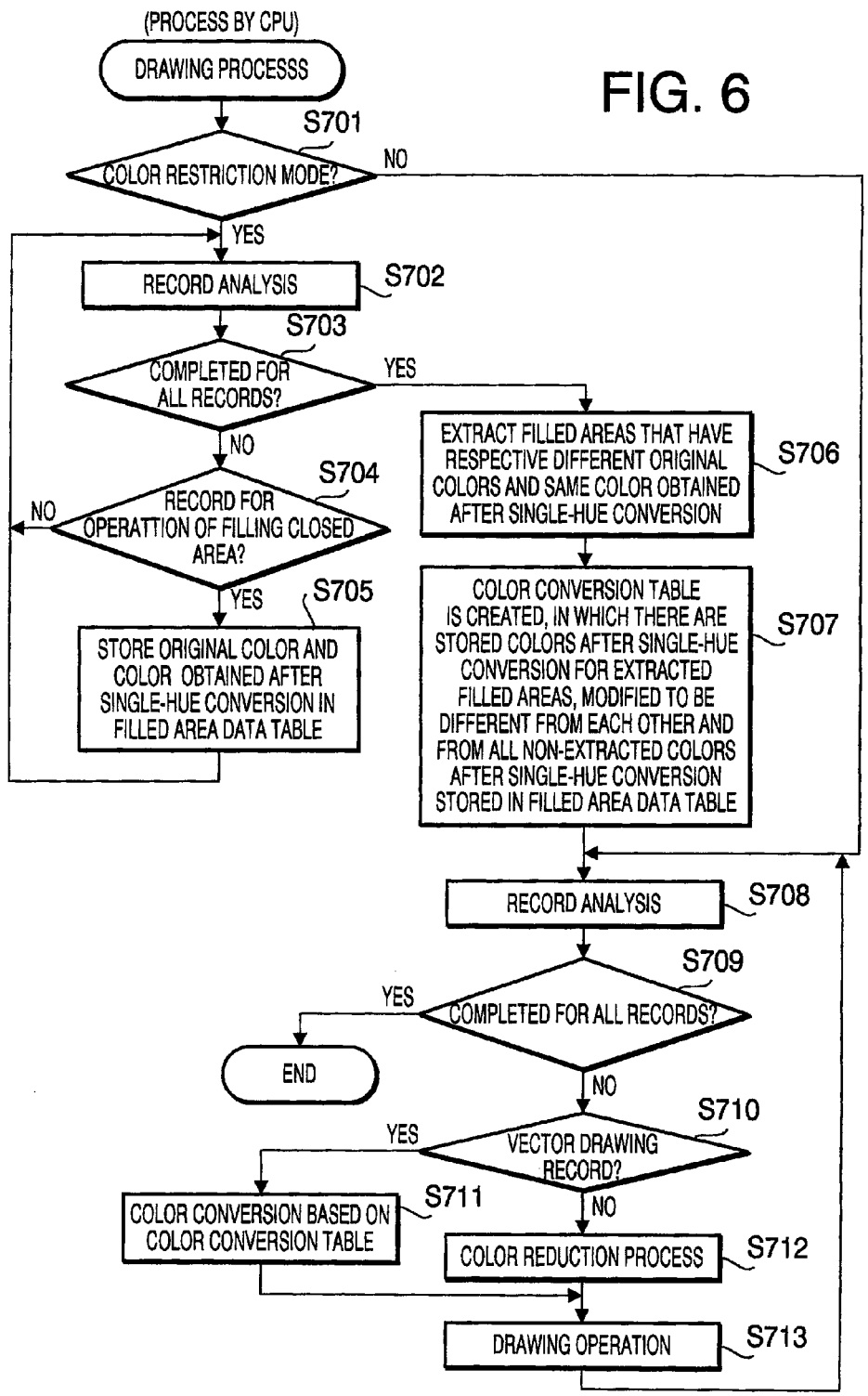

FIG. 6 is a flowchart showing a drawing process in a second embodiment according to one or more aspects of the present invention.

FIG. 7 is a flowchart showing a drawing process in a third embodiment according to one or more aspects of the present invention.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the invention may be implemented in computer software as programs storable on computer-readable media including but not limited to RAMs, ROMs, flash memory, EEPROMs, CD-media, DVD-media, temporary storage, hard disk drives, floppy drives, permanent storage, and the like.

General Overview

According to aspects of the present invention, there is provided an image processing device capable of generating single-hue image data from color image data, which include at least two records of a first area to be filled with a first color based on first hue component data and a second area to be filled with a second color based on second hue component data, the first and second areas establishing one of line contact and overlap therebetween, the image processing device including a density determining unit configured to determine a first density of the first area and a second density of the second area in the single-hue image data based on the first hue component data and second hue component data, respectively, a comparing unit configured to compare the first and second densities determined by the density determining unit, and a modifying unit configured to modify at least one of the first density and second density based on the comparison result by the comparing unit.

According to some aspects, it is possible to definitely differentiate the first area from the second area that establishes line contact with or overlaps the first area even in the single-hue image by the density difference therebetween.

Optionally, the comparing unit may include a density difference judging unit configured to judge whether a density difference between the first and second densities is lower than a predetermined value. In this case, the modifying unit may be configured to modify at least one of the first density and second density such that the density difference therebetween is equal to or higher than the predetermined value when the density difference judging unit judges that the density difference is lower than the predetermined value.

According to some aspects, by considering the predetermined value of the density difference when comparing the first and second densities, it is possible to prevent a problem that the first density and the second density, when they are visually too close to be discriminated, are strictly judged to be different from one another based on their accurate density values.

Still optionally, the comparing unit may include an original color comparing unit configured to judge whether the first color of the first area is different from the second color of the second area in the color image data based on the first hue component data and second hue component data. In this case, the density difference judging unit may be configured to judge whether the density difference between the first and second densities is lower than the predetermined value when the original color comparing unit judges that the first color of the first area is different from the second color of the second area in the color image data.

According to some aspects, when the first color of the first area is the same as the second color of the second area in the original color image, any of the first density and second density is not modified, and they are expressed as the same density in the single-hue image. Therefore, when the original color image data are intended to express a couple of the first and second areas as a single area, it is possible to express the couple of the first and second areas as a single area in the single-hue image as well.

Optionally, the image processing device may further include a data type judging unit configured to judge whether each of the at least two records of the first area and the second area is data other than raster data. In this case, preferably, the comparing unit may be configured to compare the first and second densities when the data type judging unit judges that each of the at least two records of the first area and second area is data other than the raster data.

According to some aspects, when each of the at least two records of the first and second areas is the raster data, any of the first and second densities is not modified. Hence, even in the single-hue image, an area represented based on the raster data can be filled with respective densities of pixels that constitute the area.

Further optionally, the data type judging unit may be configured to judge whether each of the at least two records of the first area and the second area is vector data. In this case, the comparing unit may be configured to compare the first and second densities when the data type judging unit judges that each of the at least two records of the first area and second area is the vector data.

In some aspects, an area represented based on the vector data can be filled with a density modified such that the area can be differentiated from an adjacent area thereof.

According to another aspect of the present invention, there is provided an image processing device capable of generating single-hue image data from color image data, which include records for a plurality of areas to be filled with respective colors based on respective hue component data, including a density determining unit configured to determine a density for each of the plurality of areas in the single-hue image data based on each of the hue component data, and a modifying unit configured to modify the densities determined by the density determining unit to differ among areas that have respective different hue component data.

Optionally, the image processing device may further include an extracting unit configured to extract areas that have respective different hue component data and a same density based on the densities determined for the plurality of areas by the density determining unit. In this case, the modifying unit may be configured to modify the same density of the extracted areas to differ among the extracted areas.

Furthermore, the modifying unit may be configured to modify the same density of the extracted areas to differ among the extracted areas and from the densities of the plurality of areas other than the extracted areas.

According to the image processing device configured as above, a plurality of areas, which can clearly be differentiated by hue differences therebetween in the original color image, can definitely be discriminated by density differences therebetween even in the single-hue image.

Optionally, the image processing device may further include a data type judging unit configured to judge whether each of the records of the plurality of areas is data other than raster data, and a color converting unit configured to convert a color of an extracted area into a density modified for the extracted area by the modifying unit when a record for the extracted area is judged to be data other than the raster data by the data judging unit.

In some aspects, when a record for an area under analysis is the raster data, an original color of the area is not converted into any of the modified densities. Hence, even in the single-hue image, an area represented based on the raster data can be filled with respective densities of pixels that constitute the area.

Further optionally, the data type judging unit may be configured to judge whether each of the records of the plurality of areas is vector data. In this case, the color converting unit may be configured to convert a color of an extracted area into a density modified for the extracted area by the modifying unit when a record for the extracted area is judged to be vector data by the data judging unit.

According to some aspects, in the single-hue image, an area represented based on the vector data can be filled with a corresponding density modified to differ from densities of areas that have hue component data different from that of the aforementioned area.

Optionally, the image processing device may further include a table creating unit configured to create a color conversion table that stores therein the densities modified by the modifying unit for the plurality of areas in the single-hue image associated with respective colors of the plurality of areas in the color image data.

Further optionally, the image processing device may further include a color converting unit configured to convert a color of an area in the color image data into a density of the area in the single-hue image data based on the color conversion table created by the table creating unit.

Optionally, the image processing device may further include a table converting unit configured to convert the color conversion table created by the table creating unit into data described in PDL (Page Description Language).

According to a further aspect of the present invention, there is provided a computer usable medium having computer readable instructions configured to generate single-hue image data from color image data that include at least two records of a first area to be filled with a first color based on first hue component data and a second area to be filled with a second color based on second hue component data, the first and second areas establishing one of line contact and overlap therebetween, the instructions causing a computer to perform steps of determining a first density of the first area and a second density of the second area in the single-hue image data based on the first hue component data and the second hue component data, respectively, comparing the first and second densities determined in the determining step, and modifying at least one of the first density and second density based on the comparison result in the comparing step.

By executing the instructions stored on the computer usable medium configured as above, the same effects as the aforementioned image processing device can be expected.

Illustrative Aspects

Figure 1:
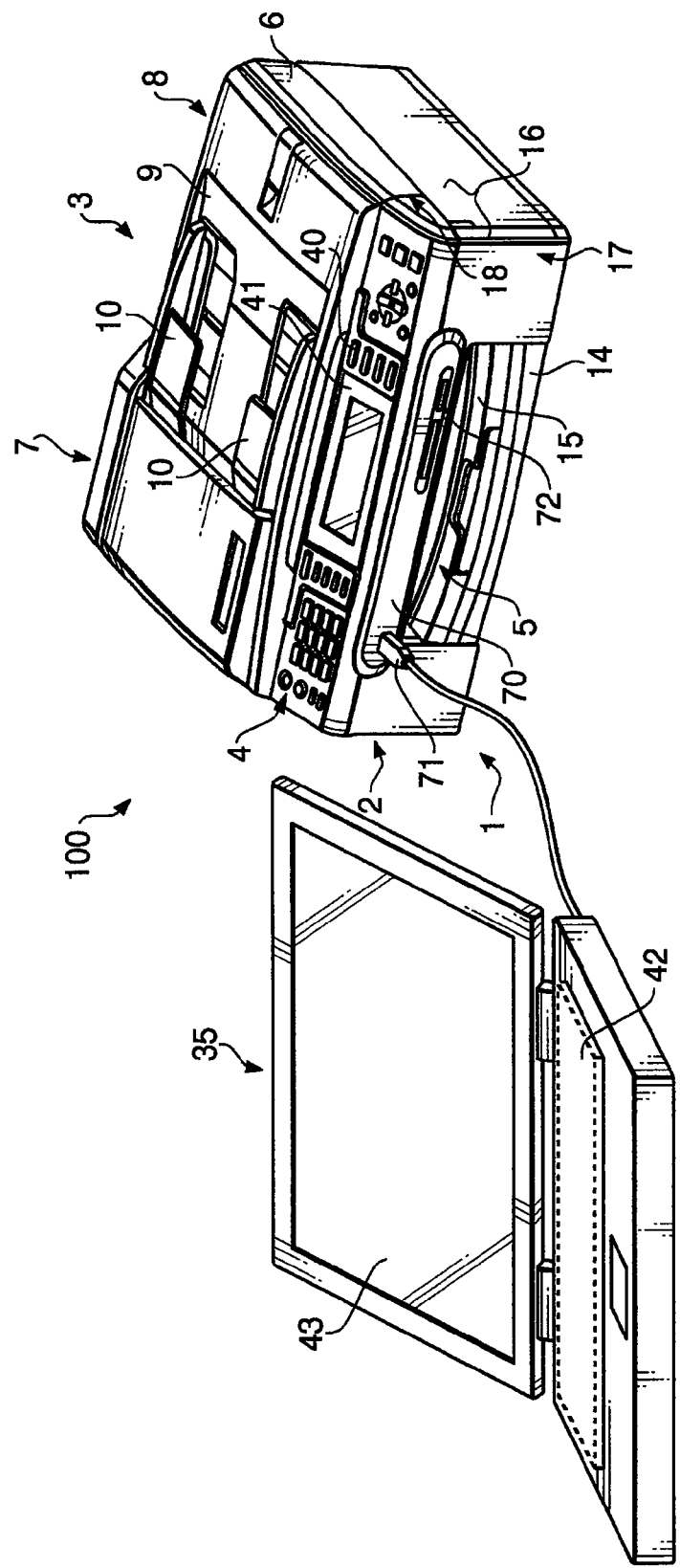
FIG. 1 is a perspective view showing an external configuration of an image generating system in accordance with one or more aspects of the present invention.

Hereinafter, embodiments according to aspects of the present invention will be described with reference to the accompanying drawings. FIG. 1 is a perspective view showing an external configuration of each of an MFP (Multi Function Peripheral) 1 and a personal computer 35 (hereinafter, simply referred to as a "PC 35") included in an image generating system 100 of an embodiment.

The MFP 1 is provided with a printer function, scanner function, copy function, and facsimile function. There is provided at the front side of the MFP 1 an operating panel 4. The operating panel 4, provided for operating a printer 2 and a scanner 3, includes various operation keys 40 and an LCD (Liquid Crystal Display) 41. A user can input an intended instruction using the operating panel 4. When the intended instruction is inputted to the MFP 1, the MFP 1 is controlled by a control unit 20 based on the inputted instruction. It is noted that the MFP 1 is configured to be controlled based on an instruction transmitted from a computer connected therewith via a printer driver or a scanner driver as well as the instruction inputted through the operating panel 4.

Figure 2:
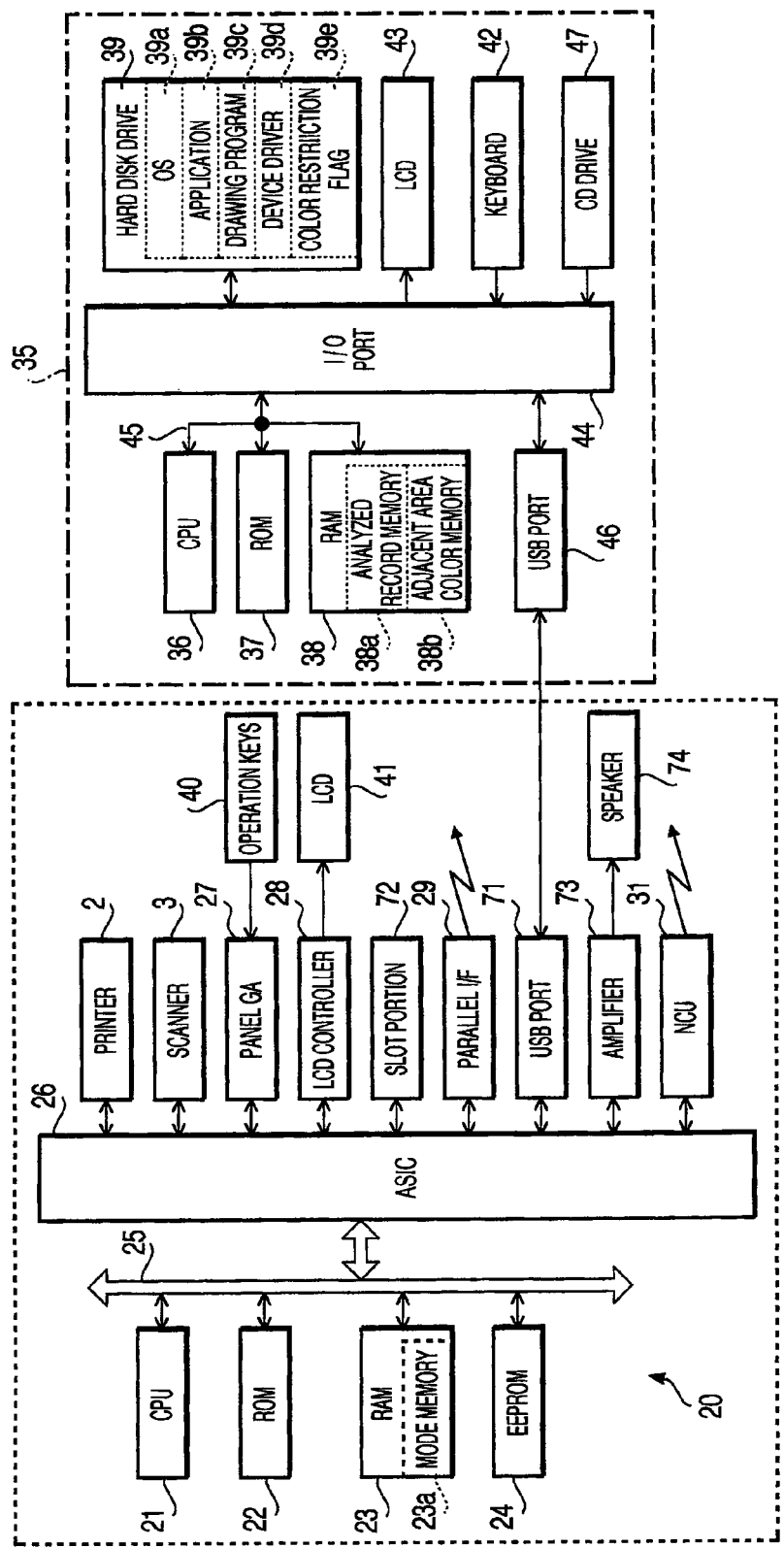
FIG. 2 is a block diagram schematically showing configurations of a control unit of an MFP and a PC that are included in the image generating system in accordance with one or more aspects of the present invention.

Referring to FIG. 2, a schematic configuration of the control unit 20 that controls the operation of the MFP 1 will be explained. FIG. 2 is a block diagram schematically showing a configuration of the control unit 20 of the MFP 1. The control unit 20 controls the operation of the MFP 1 including the printer 2, scanner 3, and operating panel 4 in a comprehensive manner. As shown in FIG. 2, the control unit 20 is configured as a microcomputer that includes, as main elements thereof, a CPU (Central Processing Unit) 21, ROM (Read Only Memory) 22, RAM (Random Access Memory) 23, and EEPROM (Electrically Erasable and Programmable ROM) 24. Further, the control unit 20 is connected with an ASIC (Application Specific Integrated Circuit) 26 via a bus 25.

The CPU 21 is a central processing unit that controls the MFP 1 in a comprehensive manner, and executes various programs such as programs as shown by flowcharts in FIGS. 4, 5, and 6. There are stored in the ROM 22 programs for controlling various operations of the MFP 1.

The RAM 23 is employed as a memory area or work area that temporarily stores various data used when the CPU 21 executes the various programs.

The ASIC 26 controls operations of the printer 2, scanner 3, operating panel 4, and a slot portion 72 based on an instruction from the CPU 21 (for example, the ASIC 26 controls operations of a motor that drives the printer 2, an inkjet recording head, a motor that drives an ADF (Auto Document Feeder) 7 of the scanner 3, and the image scanning unit). Detailed explanation on configurations of the printer 2, scanner 3, and slot portion 72, which are publicly known, will be omitted.

The ASIC 26 is connected with a panel gate array (panel GA) 27 that controls the operation keys 40 for inputting an intended instruction to the MFP 1, an LCD controller 28 that controls screen display on the LCD 41, a parallel interface (parallel I/F) 29 for data communication with an external device such as a computer via a parallel cable, and a USB port 71 for data communication with an external device such as a personal computer via the USB cable. Further, the ASIC 26 is connected with an NCU (Network Control Unit) 31. In addition, the control unit 20 may be provided with a network interface (not shown) for data communication with a computer on a network.

Meanwhile, the PC 35 includes a CPU 36, ROM 37, RAM 38, hard disk drive 39, input/output port (I/O port) 44, USB port 46, and CD drive 47. The CPU 36 controls each of the units connected therewith via a bus line 45 based on fixed values or programs stored in the ROM 37, or various signals received via the USB port 46. The ROM 37 is a non-rewritable memory that stores a control program to be executed by the PC 35 and the like. The RAM 38 is a memory that temporarily stores various data, and provided with an analyzed record memory 38a and adjacent area color memory 38b. The analyzed record memory 38a is a memory that temporarily stores an analysis result for each of a plurality of records included in the image data. The adjacent area color memory 38b is a memory that stores a color obtained after a color reduction process (described below) for an adjacent area of a record under analysis.

The hard disk drive 39 is a rewritable nonvolatile memory that stores therein an OS (Operating System) 39a, application 39b, drawing program 39c, device driver 39d, color restriction flag 39e, and the like. The OS 39a is basic software such as Windows®. The application 39b is, for example, software for creating a presentation material with which various kinds of characters and figures can be created. The drawing program 39c is software including a function of converting data generated by the application 39b into a format in which the converted data can be processed by the device driver 39d so as to establish a functional linkage between the application 39b and the device driver 39d. The drawing program 39c is referred to as a GDI in the aforementioned Windows®. A below-mentioned drawing process shown in FIG. 4 is performed in accordance with the drawing program 39c. The device driver 39d, which normally drives a peripheral device (the MFP 1 in the embodiment) connected with the PC 35, is software that establishes a functional linkage between the PC 35 and the MFP 1. For example, the device driver 39d converts image data generated by the drawing program 39c into data described in PDL (Page Description Language). The color restriction flag 39e is an indicator that indicates whether to restrict the color printing, and is configured to be settable in each user. When the color restriction flag 39e is set ON, the color printing is restricted. The USB port 46 is configured to be connectable with the USB cable to communicate with a USB device such as the MFP 1.

It is noted that the aforementioned CPU 36, ROM 37, and RAM 38 are interconnected via the bus line 45, and the bus line 45 is connected with the I/O port 41. The I/O port 41 is connected with the hard disk drive 39, a keyboard 42, an LCD 43, and USB port 46 as well as the bus line 45.

Subsequently, with reference to FIGS. 3A, 3B, and 3C, a concept of the present invention will be explained. FIG. 3A shows a circle graph A in an original color image. FIG. 3B shows a circle graph A1 corresponding to the circle graph A in a single-hue image into which the original color image is converted in a conventional method. FIG. 3C shows a circle graph A2 corresponding to the circle graph A in a single-hue image into which the original color image is converted in a method according to aspects of the present invention. It is noted that the single-hue image means an image composed of a plurality of areas expressed by the same hue or an achromatic color. In this case, when the single-hue image can be expressed by a single sort of ink or toner, a running cost for forming the single-hue image can further be reduced.

The circle graph A shown in FIG. 3A is sectioned into an area a, area b, area c, and area d. The area a is expressed by a color based on hue component data of C (Cyan): 255, M (Magenta): 255, and Y (Yellow): 0. The area b is expressed by a color based on hue component data of C: 255, M: 0, and Y: 255. The area c is expressed by a color based on hue component data of C: 0, M: 127, and Y: 127. The area d is expressed by a color based on hue component data of C: 30, M: 20, and Y: 20. Hence, it is possible to clearly distinguish the areas a through d that are expressed by different colors based on the different hue component data, respectively. In addition, a background area outside the circle graph A is expressed by white color (C: 0, M: 0, Y: 0).

Meanwhile, when the circle graph A shown in FIG. 3A is converted into a circle graph expressed as a single-hue image in the conventional method, the circle graph A is converted as the circle graph A1 shown in FIG. 3B. More specifically, the original color in each of the areas a through d shown in FIG. 3A is converted into the single hue of a density value represented by the sum of hue components (density values of C, M, and Y) included in the hue component data of the original color. Namely, an area a1 corresponding to the area a is expressed by a density value of BW: 510 (the sum of the hue components of the area a, that is, the sum of 255, 255, and 0), and an area b1 corresponding to the area b is expressed by a density value of BW: 510. Further, an area c1 corresponding to the area c is expressed by a density value of BW: 254, and an area d1 corresponding to the area d is expressed by a density value of BW: 70. In this case, when each of the hue components C, M, and Y for an original color indicates a maximum density value (255), the original color is converted into black color. Meanwhile, when each of the hue components C, M, and Y for an original color indicates a minimum density value, the original color is converted into white color. In the embodiment, the density value of the single hue is represented by the sum of the hue components included in the hue component data. However, the density value may be represented by the average value of the hue components. When the circle graph A shown in FIG. 3A is converted into the circle graph A1 as the single-hue image shown in FIG. 3B, the area a1 has the same density of the single hue as the area b1. Thereby, there is caused a problem that a boundary line K (dashed line) between the area a1 and the area b1 cannot visually recognized, i.e., it is impossible to differentiate the areas a1 and b1. Thus, different colors in an original color image that can visually be differentiated might be converted into a single hue of the same density that cannot be differentiated. Such a case causes a significant problem, for example, when a presentation material including many circle graphs or the like is printed as a single-hue image. Additionally, even a printed material other than the presentation material might not be good enough for use, depending on how the printed material is utilized.

In the embodiment, for example, the density after the single-hue image conversion for the area b1, between the adjacent two areas a1 and b1 that have their respective different original colors and the same density after the single-hue image conversion, is changed from a density value of BW: 510 (see FIG. 3B) to a density value of BW: 515 as shown in FIG. 3C. Thereby, it is possible to definitely discriminate the areas a1 and b1 by the density difference therebetween even in the single-hue image.

Next, referring to a flowchart shown in FIG. 4, there will be explained a drawing process to be executed by the PC 35 in the image generating system configured as above. When the user has issued a printing instruction to the application 39b, the application 39b transmits printing data to the OS 39a. The OS 39a spools the printing data in an intermediate file. Then, the intermediate file is sent to a print processor as a module included in the OS, and the print processor sends the printing data to the printer driver. The intermediate file is a data aggregate referred to as a record. There are various kinds of records such as a record including an instruction and data for drawing a line, a record for filling an area, and a record including data for drawing a character. An intended drawing operation can be performed with such records being executed in a recorded order by the aforementioned print processor or printer driver.

FIG. 4 is a flowchart showing the drawing process. It is noted that the drawing process in the embodiment is generally to be executed by the printer driver, yet the flowchart shown in FIG. 4 also partially includes operations to be performed by the print processor so as to clarify an entire flow of the data processing. According to the printing device in the embodiment, as described above, the running cost for the color printing is higher than that for the monochrome printing. For this reason, the printing device in the embodiment has a color restriction mode for reducing the running cost. In the color restriction mode, even though the color printing is selected, a single-hue (monochrome) image is forcibly generated. In the embodiment, a login name for the OS 39a is compared with user names of predetermined users permitted to utilize the color printing. When the log-in name is not identical to any of the user names of the predetermined users, the color restriction flag 39e is set ON to indicate that the color restriction mode is active, and otherwise the color restriction flag 39e is set OFF.

In the drawing process, firstly, each record for image data including a plurality of records is analyzed (S501). Then, it is judged whether all of the records included in the image data are completely analyzed (S502). When it is judged that all of the records are completely analyzed (S502: Yes), the process is terminated. It is noted that an analysis result for each of the analyzed records is temporarily stored in the analyzed record memory 38a until all of the records included in the image data are completely analyzed.

When it is not judged that all of the records are completely analyzed (S502: No), it is judged whether a target record (record under analysis) is a record for an operation of filling a closed area (S503). When it is judged that the target record is a record for an operation of filling a closed area (S503: Yes), it is judged whether the color restriction mode is active (S504). It is possible to judge whether the color restriction mode is active by checking whether the color restriction flag 39e is set ON. When it is not judged that the color restriction mode is active (S504: No), an instruction for the operation of filling the closed area is issued (S513), and then the process is repeated from the step S501 to analyze a next record. Meanwhile, when it is judged that the color restriction mode is active (S504: Yes), an adjacent area color checking process is performed (S505).

Referring to FIG. 5 that is a flowchart showing the adjacent area color checking process, there will be explained the adjacent area color checking process (S505). The adjacent area color checking process is a process of checking a color obtained after the color reduction process (a density of the single-hue) for an adjacent area of a filled area under analysis. Now suppose that the target record in the step S505 is an N-th record analyzed in the step S501. In this case, (N−1) records have already been analyzed, and the (N−1) records are to be checked in the adjacent area color checking process of the step S505.

In this process, firstly, it is judged whether there remains an analyzed record (S601). When "N" is equal to "1", the judgment is negative. Meanwhile, when "N" is not equal to "1" (S601: Yes), a filled area is searched from the analyzed records (S602). Then, it is judged whether a filled area found from the analyzed records establishes a line contact with the filled area under analysis (S603).

When it is judged that the found filled area establishes a line contact with the filled area under analysis (S603: Yes), the analyzed filled area is recognized as an adjacent area of the filled area under analysis, and the color obtained after the color reduction process for the analyzed filled area is stored in the adjacent area color memory 38b (S604). Thereafter, the process is repeated from the step S601. When the checking operation has been completed for each of the (N−1) analyzed records (S601: No), the process is terminated. In this manner, it is possible to check the color obtained after the color reduction process (i.e., the density of the single hue) for a filled area adjacent to the filled area under analysis. Meanwhile, when it is not judged in the step S603 that the found filled area establishes a line contact with the filled area under analysis (S603: No), in other words, when the found filled area is not an area adjacent to the filled area under analysis, the process is repeated from the step S601. It is noted that, when the filled area under analysis in the step S603 is adjacent to an undrawn area that generally has white color, the undrawn area is regarded as an area to be filled with white color, and white color is stored in the adjacent area color memory 38b in the step S604.

Referring to FIG. 4 again, the explanation on the drawing process will be continued. After the step S505, it is judged whether there is an adjacent area of the same original color as the filled area under analysis (S506). When it is not judged that there is an adjacent area of the same original color as the filled area under analysis (S506: No), the color reduction process is performed for the filled area under analysis. For example, as described with reference to FIG. 3, the color of the filled area under analysis is converted into the density of the single hue based on the hue component data included in the record, and the density of the single hue is set as a base color (S507). Then, an additional density value is set to be "0" (S508). Further, a drawing color (drawing density of the single hue) with which the filled area under analysis is to be filled is set as the sum of the base color and the additional density value (S509).

Subsequently, it is judged whether there is an adjacent area of the same color (density) as the drawing color set for the filled area under analysis in the step S509 (S510). When it is judged that there is an adjacent area of the same color as the drawing color of the filled area under analysis (S510: Yes), the additional density value that has been set to be "0" in the step S508 is increased by a predetermined value (S511), and the steps from S509 are repeated. Thereby, the drawing color of the filled area under analysis can be set to be different from the color for any of the adjacent areas. Meanwhile, when it is not judged in the step S510 that there is an adjacent area of the same color as the drawing color of the filled area under analysis (S510: No), an instruction for drawing the filled area under analysis is issued (S513). Then, the process is repeated from the step S501 to analyze a next record. When the drawing operation for the filled area is performed in this manner, a first area and a second area adjacent to the first area in the single-hue image are generated with different drawing colors (densities), respectively. Therefore, it is possible to definitely discriminate the first and second areas even in the single-hue image.

In the meantime, when it is judged in the step S506 that there is an adjacent area of the same original color as the filled area under analysis (S506: Yes), the color reduction process is performed for the filled area under analysis such that the drawing color (density) of the filled area under analysis is the same as that of the adjacent area (S512). Then, the instruction of the drawing operation for the filled area under analysis is issued (S513). Thereby, when the image data are intended to express adjacent areas as a single area, it is possible to express the adjacent areas as a single area in the single-hue image as well.

In addition, when it is not judged in the step S503 that the target record is a record for an operation of filling a closed area (S503: No), it is judged whether the target record is a record for an operation of drawing a line segment (S514). When it is judged that the target record is a record for an operation of drawing a line segment (S514: Yes), it is judged whether the color restriction mode is active (S515). When it is judged that the color restriction mode is active (S515: Yes), after the color reduction process (S516), an instruction of drawing the line segment is issued (S517). Thereafter, the drawing process is repeated from the step S501 to analyze a next record. Meanwhile, when it is not judged that the color restriction mode is active (S515: No), the instruction of drawing the line segment is issued (S517) without performing the color reduction process in the step S516. The drawing process is then repeated from the step S501. Thus, the operation of drawing the line segment is performed.

Meanwhile, when it is not judged in the step S514 that the target record is a record for an operation of drawing a line segment (S514: No), it is judged whether the target record is a record for another drawing operation (e.g., a drawing operation based on raster data) (S518). When it is judged that the target record is a record for the corresponding drawing operation (S518: Yes), it is judged whether the color restriction mode is active (S519). When it is judged that the color restriction mode is active (S519: Yes), after the color reduction process (S520), an instruction of the corresponding drawing operation is issued (S521). Then, the drawing process is repeated from the step S501. On the other hand, when it is not judged that the color restriction mode is active (S519: No), the instruction of the corresponding drawing operation is issued (S521) without performing the color reduction process in the step S520. Thereafter, the drawing process is repeated from the step S501. the corresponding drawing operation is thus carried out.

Thus, when it is not judged in the step 503 that the record under analysis (target record) is a record for an operation of filling a closed area (S503: No), in other words, when the record under analysis is not a drawing record for vector data (i.e., data for vector graphics) but, for example, a drawing record for raster data (i.e., data for raster graphics), the color (density) after the color reduction process is not changed. This is because the raster data, which are an aggregate of hue information for each pixel included in an image, are data for generating an image by using hue differences between the pixels included in the data. Therefore, in this case, there is generated such an image that density differences between the pixels are found in an area represented by the raster data even after the conversion into the single-hue image, and it is possible to avoid a negative effect on the image that might be brought by changing the densities of the image.

Meanwhile, when it is judged in the step 503 that the record under analysis is a record for an operation of filling a closed area (S503: Yes), in other words, when the record under analysis is a drawing record for vector data (i.e., data for vector graphics), the color (density) after the color reduction process is changed. This is because the vector data, which are an aggregate of parameters showing in what kind of shape a predetermined hue is applied, are data for generating an image of an area to be filled with a single hue by using hue differences between the area and other areas. Therefore, an image of the area filled with a single density is generated after the conversion into the single-hue image. Namely, there can be generated the single-hue image in which an original intention is reflected by making the single density of the area different from densities of other areas. The PC 35 transmits the single-hue image data generated in this manner to the MFP 1, and the MFP 1 prints an image based on the single-hue image data.

Next, referring to a flowchart shown in FIG. 6, there will be explained a drawing process in a second embodiment that corresponds to the drawing process in the first embodiment described with reference to FIG. 5. The drawing process in the second embodiment is a process of drawing an image based on image data generated by the application 39b, and a process to be executed by the CPU 36 of the PC 35 in accordance with the drawing program 39*c*.

In the drawing process in the second embodiment, firstly, it is judged whether the color restriction mode is active (S701). When it is not judged that the color restriction mode is active (S701: No), the process goes to a step S708. Meanwhile, when it is judged that the color restriction mode is active (S701: Yes), the record analysis is started (S702), and it is judged whether the record analysis has been performed for all records (S703). When it is not judged that the record analysis has been performed for all records (S703: No), it is judged whether the record under analysis is a drawing record for filling a closed area (S704). When it is judged that the record under analysis is a drawing record for filling a closed area (S704: Yes), an original color and a color after single-hue conversion (density of a single hue) of the closed area are stored in a filled area data table (S705). It is noted that the filled area data table is stored in the RAM 38 shown in FIG. 2. Then, after the step S705, or when it is not judged in the step S704 that the record under analysis is a drawing record for filling a closed area (S704: No), the steps from S702 are repeated to perform the record analysis.

Thus, when it is judged in the step S703 that the record analysis has been performed for all records (S703: Yes), there are extracted, from the filled area data table created in the step S705, filled areas that have their respective different original colors and the same color after the single-hue conversion (the same density of the single hue) (S706). Thereafter, a color conversion table is created, in which there are stored colors after the single-hue conversion for the extracted filled areas, modified to be different from each other and from all non-extracted colors after the single-hue conversion stored in the filled area data table (S707). It is noted that the created color conversion table is stored in the RAM 38 of the PC 35 shown in FIG. 2.

Then, the record analysis is started again (S708), and it is judged whether the record analysis has been performed for all of the records (S709). When it is not judged that the record analysis has been performed for all of the records (S709: No), it is judged whether the record under analysis is a drawing record for vector data (S710). When it is judged that the record under analysis is a drawing record for vector data (S710: Yes), a color conversion (conversion into a single-hue image) is performed by using the color conversion table created in the step S707 (S711). Meanwhile, when it is not judged that the record under analysis is a drawing record for vector data (S710: No), for example, the color reduction process is performed with a density value as a sum or an average of the hue components included in the hue component data as described with reference to FIG. 3B (S712).

Thus, when the record under analysis is a drawing record for vector data (i.e., data for vector graphics) (S710: Yes), the color conversion is performed with the color conversion table. This is because the vector data, which are an aggregate of parameters showing in what kind of shape a predetermined hue is applied, are data for generating an image of an area to be filled with a single hue by using hue differences between the area and other areas. Therefore, an image of the area filled with a single density is generated after the conversion into the single-hue image. Namely, there can be generated the single-hue image in which an original intention is reflected by making the single density of the area different from densities of other areas.

In the meantime, when it is not judged in the step S710 that the record under analysis is a drawing record for vector data (i.e., data for vector graphics) (S710: No), namely, for example, when the record under analysis is a drawing record for raster data (i.e., data for raster graphics), the color reduction process is performed without the color conversion table. This is because the raster data, which are an aggregate of hue information for each pixel included in an image, are data for generating an image by using hue differences between the pixels included in the data. Therefore, there is generated such an image that density differences between the pixels are found in an area represented by the raster data even after the conversion into the single-hue image. Thus, the single-hue image based on the raster data makes it possible to discriminate a shape represented by the image by the density differences between the pixels. In this case, it is possible to avoid such a negative effect brought by changing the densities of the pixels that it is rather hard to recognize the shape represented by the image.

Then, there is issued an instruction of a drawing operation with the converted color (S713), and the steps from S708 are repeated to analyze a next record. When it is judged in the step S709 that the record analysis has been performed for all of the records (S709: Yes), the process is terminated. Thus, according to the drawing process in the second embodiment, as a first step, the drawing records for filling the closed areas are extracted from all of the records (S702 to S705), and the filled areas whose colors (densities) after the color reduction process is to be converted are specified (S706 to S707). As a second step, the record analysis is started again to perform the steps S708 to S713. Therefore, unlike the drawing process in the first embodiment, the filled areas with the same original color can certainly be drawn as single-hue images of the same color (the same density) in the second embodiment. The PC 35 transmits the single-hue image data generated in this manner to the MFP 1, and the MFP 1 prints an image based on the single-hue image data.

The first and second embodiments are examples in which the color reduction process is performed by the printer driver of the PC 35. However, the color reduction process may be carried out by the print processor. In this case, instead of the aforementioned drawing process, an intermediate file is rewritten.

In addition, the processes in the embodiments may be executed by the MFP 1. In this case, the MFP 1 is capable of performing operations in accordance with instructions described in PDL for drawing a line segment or filling a closed area. Further, when a record included in the intermediate file is a record representing an instruction and data for drawing a line segment, the printer driver transmits the instruction for drawing a line segment to the MFP 1. Meanwhile, when the record included in the intermediate file is a record representing for filling a closed area, the printer driver transmits the instruction for filling a closed area to the MFP 1. Additionally, when the aforementioned processes are performed by the MFP 1, the records described in the aforementioned flowcharts are replaced with individual drawing instructions described in PDL.

Subsequently, referring to a flowchart shown in FIG. 7, there will be explained a drawing process in a third embodiment that corresponds to the drawing process in the first embodiment described with reference to FIG. 5. The third embodiment is an example of a drawing process applied to the printer driver for the MFP 1 having a function of downloading a color conversion table from the printer driver and performing a drawing operation in accordance with the color conversion table. It is noted that the process in the third embodiment is to be executed by the printer driver, yet the flowchart shown in FIG. 7 also partially includes operations to be performed by the print processor so as to clarify an entire flow of the data processing. In addition, the MFP 1 is a general-purpose type of MFP capable of downloading the color conversion table.

In the drawing process of the third embodiment, firstly, it is judged whether the color restriction mode is active (S801). When it is judged that the color restriction mode is active (S801: Yes), the record analysis is started (S802). Then, a PDL drawing instruction is transmitted to the MFP 1 (S803), and it is judged whether the record analysis is performed for all of the records (S 804). When it is not judged that the record analysis is performed for all of the records (S804: No), it is judged whether the record under analysis is a drawing record for filling a closed area (S805). When it is judged that the record under analysis is a drawing record for filling a closed area (S805: Yes), an original color and a color after the single-hue conversion (density of a single hue) for the filled area are stored in the filled area data table (S806). It is noted that the filled area data table is stored in the RAM 38 shown in FIG. 2. After the step S806, or when it is not judged in the step S805 that the record under analysis is a drawing record for filling a closed area (S805: No), the steps from S802 are repeated to analyze a next record.

Thus, when it is judged in the step S804 that the record analysis is performed for all of the records (S804: Yes), there are extracted, from the filled area data table created in the step S806, filled areas that have their respective different original colors and the same color after the single-hue conversion (the same density of the single hue) (S807). Thereafter, a color conversion table is created, in which there are stored colors after the single-hue conversion for the extracted filled areas, modified to be different from each other and from all non-extracted colors after the single-hue conversion stored in the filled area data table (S808). It is noted that the created color conversion table is stored in the RAM 38 of the PC 35 shown in FIG. 2. Then, the created color conversion table is converted into data described in PDL (S809). Thereafter, the color conversion table described in PDL is transmitted to the MFP 1 (S810), and the process is terminated.

Meanwhile, when it is not judged in the step S801 that the color restriction mode is active (S801: No), the record analysis is started (S811). Then, the PDL drawing instruction is transmitted to the MFP 1 (S812), and it is judged whether the record analysis has been performed for all of the records (S813). The steps from S811 are repeated until all of the records are completely analyzed. When all of the records have completely been analyzed (S813: Yes), the process is terminated.

After the drawing process, the printer driver transmits the drawing instructions and image data for one page to the MFP 1. The MFP 1 analyzes the drawing instructions and temporarily performs color conversion with virtual color information to generate image data in an internal memory. Thereafter, the printer driver transmits the color conversion table to the MFP 1. In a printing operation, the MFP 1 performs color conversion for the image data generated in the internal memory based on the downloaded color conversion table, and sequentially sends the image data to a printing head to print the image.

Thus, according to the drawing process in the third embodiment, the color conversion table is created in the PC 35 in the step S808, and then transmitted to the MFP 1 after being converted into the PDL data. The actual color conversion based on the color conversion table is performed by the MFP 1. Therefore, unlike the drawing process in the second embodiment in which the color conversion table is created and then the record analysis is performed again based on the color conversion table as created, the record analysis is not required to be performed again in the drawing process of the third embodiment. Hence, the drawing process at the side of the PC 35 is performed more promptly.

Hereinabove, the embodiments according to aspects of the present invention has been described. The present invention can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present invention. However, it should be recognized that the present invention can be practiced without resorting to the details specifically set forth. In other instances, well known processing structures have not been described in detail, in order not to unnecessarily obscure the present invention.

Only exemplary embodiments of the present invention and but a few examples of its versatility are shown and described in the present disclosure. It is to be understood that the present invention is capable of use in various other combinations and environments and is capable of changes or modifications within the scope of the inventive concept as expressed herein.

For example, the drawing process as shown in each of FIGS. 4, 6, and 7 may be performed by the MFP 1 in which a program corresponding to the drawing program 39*c* is installed.

Furthermore, the drawing process as shown in each of FIGS. 4, 6, and 7 may be executed by a plurality of devices working in conjunction with each other.

In the embodiments, there have been cited examples in which the data generated by the application in the PC 35 are printed. However, the MFP 1 may be configured to have a capability of performing the drawing operation as shown in each of FIGS. 4, 6, and 7 in addition to a capability of analyzing image data to generate records, and such an MFP 1 may be applied to a case where there are printed text data of a presentation material stored in a USB memory inserted in the USB port 71 or a memory card inserted in the slot portion 72, image data obtained by scanning the presentation material with the scanner 3, or application data generated by the application that are transmitted by the PC 35 connected with the USB port 71 via the USB cable or by a PC connected with the MFP 1 via a LAN.

In the aforementioned embodiments, the operation in each of the steps S510 in FIG. 4, S706 in FIG. 6, and S807 in FIG. 7 is performed in accordance with the condition in which a plurality of filled areas have the same color (the same density of the single hue) after the color reduction process. However, the operation in each of the steps S510, S706, and S807 may be performed in accordance with a condition in which differences in the color (density of the single hue) after the color reduction process between the plurality of filled areas are lower than a predetermined value. The predetermined value may be a density difference that cannot visually be recognized by a human being, and, for instance, a density difference of "3" in the aforementioned cases. Thus, by considering such a predetermined value of the density difference when comparing the densities of the plurality of filled areas, it is possible to prevent a problem that densities of the plurality of filled areas, which are visually almost the same, are strictly judged to be different from each other based on their accurate density values.

In the aforementioned embodiments, a color of a filled area under analysis to be obtained after the color reduction process is modified such that the filled areas can clearly be discriminated even in the single-hue image. However, it is noted that the aforementioned techniques according to aspects of the present invention may be applied to the color reduction process for a line segment in the step S516.

The aforementioned embodiments are examples in which the present invention is applied to a color printing device. However, the present invention may be applied to data conversion from original color image data to monochrome image data in the PC 35 or a print server connected with a monochrome printer when printing the original color image data with the monochrome printer.

What is claimed is:

1. An image processing device comprising:
   a processor; and
   memory storing instructions that, when executed by the processor, causes the image processing device to:
   generate single-hue image data from color image data, which single-hue image data includes at least three records, a first record that represents a first area filled with a first color based on first hue component data in the color image data, a second record that represents a second area filled with a second color based on second hue component data in the color image data, the first and second records establishing one of line contact and overlap between the first area and the second area, and a third record that represents a third area filled with a third color based on third hue component data in the color image data, the first and third records establishing one of line contact and overlap between the first area and the third area;
   determine, on a record-by-record basis, a first density of the first area and a second density of the second area in the single-hue image data based on the first hue component data and the second hue component data, respectively, of the color image data;
   compare the determined first and second densities responsive to determining that each of the first and second records is a record for an operation of filling a closed area;
   modify at least one of the first density and second density based on a result of the comparison responsive to determining that each of the first and second records is a record for an operation of filling a closed area;
   determine a third density of the third area in the single-hue image data based on the third hue component data of the color image data;
   determine whether the first density is identical to at least one of the second and third densities;
   perform a predetermined modification operation to modify the first density when determining that the first density is identical to at least one of the second and third densities; and
   repeat the predetermined modification operation until determining that the first density is different from any of the second and third densities.

2. The image processing device according to claim 1, wherein the instructions include at least one instruction that, when executed by the processor, causes the image processing device to:
   judge whether a density difference between the first and second densities is lower than a predetermined value, and
   modify at least one of the first density and second density such that the density difference therebetween is equal to or higher than the predetermined value when judging that the density difference is lower than the predetermined value.

3. The image processing device according to claim 2, wherein the instructions include at least one instruction that, when executed by the processor, causes the image processing device to:
   judge whether the first color of the first area is different from the second color of the second area in the color image data based on the first hue component data and second hue component data, and
   judge whether the density difference between the first and second densities is lower than the predetermined value when judging that the first color of the first area is different from the second color of the second area in the color image data.

4. The image processing device according to claim 1, wherein the instructions include at least one instruction that, when executed by the processor, causes the image processing device to:
   judge whether each of the at least two records of the first area and the second area is data other than raster data, and
   compare the first and second densities when judging that each of the at least two records of the first area and second area is data other than the raster data.

5. The image processing device according to claim 4, wherein the instructions include at least one instruction that, when executed by the processor, causes the image processing device to:
   judge whether each of the at least two records of the first area and the second area is vector data, and
   compare the first and second densities when judging that each of the at least two records of the first area and second area is the vector data.

6. A non-transitory computer-readable storage medium having computer readable instructions that, when executed, cause a computer to perform the steps of:
   generating single-hue image data from color image data, wherein said single-hue image data includes at least three records, a first record that represents a first area filled with a first color based on first hue component data in the color image data, a second record that represents a second area filled with a second color based on second hue component data in the color image data, the first and second records establishing one of line contact and overlap between the first area and the second area, and a third record that represents a third area filled with a third color based on third hue component data in the color image data, the first and third records establishing one of line contact and overlap between the first area and the third area;
   determining a first density of the first area and a second density of the second area in the single-hue image data based on the first hue component data and the second hue component data, respectively;
   comparing the first and second densities determined in the determining step responsive to determining that each of the first and second records is a record for an operation of filling a closed area;
   modifying at least one of the first density and second density based on the comparison result in the comparing step responsive to determining that each of the first and second records is a record for an operation of filling a closed area; and
   determining a third density of the third area in the single-hue image data based on the third hue component data of the color image data;
   determining whether the first density is identical to at least one of the second and third densities;
   performing a predetermined modification operation to modify the first density when determining that the first density is identical to at least one of the second and third densities, and
   repeating the predetermined modification operation until determining that the first density is different from any of the second and third densities.

* * * * *